United States Patent
Tsuruga et al.

(10) Patent No.: US 8,484,754 B2
(45) Date of Patent: Jul. 9, 2013

(54) OUTPUT CONTROL METHOD

(75) Inventors: Sadao Tsuruga, Yokohama (JP); Hiroo Okamoto, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 316 days.

(21) Appl. No.: 12/606,598

(22) Filed: Oct. 27, 2009

(65) Prior Publication Data

US 2010/0115632 A1 May 6, 2010

(30) Foreign Application Priority Data

Oct. 27, 2008 (JP) ................ 2008-275047
Oct. 27, 2008 (JP) ................ 2008-275048
Dec. 26, 2008 (JP) ................ 2008-331864
Dec. 26, 2008 (JP) ................ 2008-331866

(51) Int. Cl.
*G06F 21/00* (2006.01)

(52) U.S. Cl.
USPC .................................................. 726/31

(58) Field of Classification Search
USPC .................... 726/31–33; 380/203; 360/60
See application file for complete search history.

(56) References Cited

U.S. PATENT DOCUMENTS

| 2002/0006199 A1* | 1/2002 | Sako et al. .............. 380/201 |
| 2003/0026425 A1 | 2/2003 | Okamoto et al. |
| 2003/0152368 A1* | 8/2003 | Kitani ................... 386/94 |
| 2004/0028228 A1 | 2/2004 | Hamada et al. |
| 2006/0077825 A1 | 4/2006 | Nonaka et al. |
| 2007/0107066 A1 | 5/2007 | Morinaga et al. |
| 2007/0230900 A1 | 10/2007 | Toriumi et al. |

FOREIGN PATENT DOCUMENTS

| CN | 1783298 | 6/2006 |
| EP | 1 073 273 | 1/2001 |
| EP | 1 347 642 | 9/2003 |
| EP | 2 001 023 A2 | 12/2008 |
| JP | 2002-10189 | 1/2002 |
| JP | 2002-319227 | 10/2002 |
| JP | 2003-22338 | 1/2003 |

(Continued)

OTHER PUBLICATIONS

Japanese Office Action issued Sep. 4, 2012; Application No. JP 2008-331864.
Japanese Office Action issued Feb. 21, 2012; Application No. JP 2008-275047.

(Continued)

*Primary Examiner* — Brandon Hoffman
*Assistant Examiner* — Anthony Brown
(74) *Attorney, Agent, or Firm* — Antonelli, Terry, Stout & Kraus, LLP.

(57) ABSTRACT

An output control method for controlling copy operation for a digital broadcast program permitted to be recorded for one generation (copy one generation) with an improved operating convenience. A digital content and a plurality of types of copy control information for controlling the copies of the digital content are received, and in accordance with the copy control information, the digital content is output to a plurality of recording media connected through a network. If first information contained in the copy control information received indicates copy generation information to permit copies for one generation and second information contained in the copy control information indicates "limited number of copies permitted" mode permitting a predetermined number of copies, then the digital content is output to only one of the recording media in a state permitting copying up to the predetermined number.

11 Claims, 14 Drawing Sheets

FOREIGN PATENT DOCUMENTS

| | | |
|---|---|---|
| JP | 2007-124475 | 5/2005 |
| JP | 2006-114090 | 4/2006 |
| JP | 2008-204523 | 4/2008 |
| JP | 2008-305463 | 12/2008 |
| JP | 2008-305465 | 12/2008 |
| WO | WO 2005/093745 | 10/2005 |

OTHER PUBLICATIONS

Japanese Office Action issued Feb. 21, 2012; Application No. JP 2008-275048.

Japanese Office Action issued May 21, 2013; Application No. JP 2008-331864.

* cited by examiner

FIG.3
CONTENT USE DESCRIPTOR

| DATA STRUCTURE | NUMBER OF BITS | BIT STRING EXPRESSION |
|---|---|---|
| content_availability_descriptor () { | | |
|     descriptor_tag | 8 | uimsbf |
|     descriptor_length | 8 | uimsbf |
|     reserved_future_use | 1 | bslbf |
|     digital_recording_control_mode | 1 | bslbf |
|     image_constraint_token | 1 | bslbf |
|     retention_mode | 1 | bslbf |
|     retention_state | 3 | bslbf |
|     encryption_mode | 1 | bslbf |
|     for(i=0;i<N;i++){ | | |
|         reserved_future_use | 8 | uimsbf |
|     } | | |
| } | | |

FIG.4
APPLICATION RULE FOR TRANSMITTING CONTENT USE DESCRIPTOR

| APPLICATION RULE FOR TRANSMISSION OF EACH FIELD | |
|---|---|
| descriptor_tag | DESCRIBE "0xDE" |
| descriptor_length | DESCRIBE LENGTH OF CONTENT USER DESCRIPTOR |
| digital_recording_control_mode | DESCRIBE "0" IN THE CASE WHERE DIGITAL COPY CONTROL INFORMATION IS "COPY PERMITTED ONLY FOR ONE GENERATION" BUT NOT IN "LIMITED NUMBER OF COPIES PERMITTED" MODE |
| image_constraint_token | DESCRIBE "1" |
| retention_mode | DESCRIBE "0" |
| retention_state | DESCRIBE "111" |
| encryption_mode | DESCRIBE "0" IN THE CASE WHERE DIGITAL COPY CONTROL INFORMATION IS "COPY PERMITTED WITHOUT RESTRAINTS" AND HIGH-SPEED DIGITAL INTERFACE OUTPUT IS PROTECTED |

FIG.5

DIGITAL COPY CONTROL DESCRIPTOR

| DATA STRUCTURE | NUMBER OF BITS | BIT STRING EXPRESSION |
|---|---|---|
| digital_copy_control_descriptor () { | | |
|     descriptor_tag | 8 | uimsbf |
|     descriptor_length | 8 | uimsbf |
|     digital_recording_control_data | 2 | bslbf |
|     maximum_bit_rate_flag | 1 | bslbf |
|     component_control_flag | 1 | bslbf |
|     copy_control_type | 2 | bslbf |
|     if(copy_control_type==01)){ | | |
|         APS_control_data | 2 | bslbf |
|     } | | |
|     else{ | 2 | bslbf |
|         reserved_future_use | | |
|     } | | |
|     if(maximum_bit_rate_flag==1){ | | |
|         maximum_bit_rate | 8 | uimsbf |
|     } | | |
|     if(component_control_flag==1){ | | |
|         component_control_length | 8 | uimsbf |
|         for(j=0;j<N;j++){ | | |
|             component_tag | 8 | uimsbf |
|             digital_recording_control_data | 2 | bslbf |
|             maximum_bitrate_flag | 1 | bslbf |
|             reserved_future_use | 1 | bslbf |
|             copy_control_type | 2 | bslbf |
|             if(copy_control_type==01){ | | |
|                 APS_control_data | 2 | bslbf |
|             } | | |
|             else{ | | |
|                 reserved_future_use | 2 | bslbf |
|             } | | |
|             if(maximum_bitrate_flag==1){ | | |
|                 maximum_bitrate | 8 | uimsbf |
|             } | | |
|         } | | |
|     } | | |
| } | | |

FIG.6
DIGITAL COPY CONTROL INFORMATION

| DIGITAL COPY CONTROL INFORMATION | DESCRIPTION |
| --- | --- |
| 00 | COPY PERMITTED WITHOUT RESTRAINTS |
| 01 | PROVIDER DEFINE *1 |
| 10 | COPY PERMITTED ONLY FOR ONE GENERATION *2 |
| 11 | COPY PROHIBITED |

*1: PROVIDER CAN UNIQUELY DEFINE
*2: RECEIVED BROADCAST SIGNAL CAN BE RECORDED (COPY FOR FIRST GENERATION) BUT RECORDED SIGNAL CANNOT BE COPIED

FIG.7
RECEIVING PROCESS RULE FOR CONTENT USE DESCRIPTOR

| RECEIVING PROCESS RULE FOR EACH FIELD | |
| --- | --- |
| descriptor_tag | ="0xDE": PARTICULAR DESCRIPTOR JUDGED AS CONTENT USE DESCRIPTOR |
| descriptor_length | JUDGED AS LENGTH OF CONTENT USE DESCRIPTOR |
| digital_recording_control_mode | ='1': IN THE CASE WHERE DIGITAL COPY CONTROL INFORMATION IS IN "COPY PERMITTED ONLY FOR ONE GENERATION" MODE, "LIMITED NUMBER OF COPIES PERMITTED" JUDGED TO PREVAIL<br>='0': IN THE CASE WHERE DIGITAL COPY CONTROL INFORMATION IS IN "COPY PERMITTED ONLY FOR ONE GENERATION" MODE, "LIMITED NUMBER OF COPIES PERMITTED" IS NOT JUDGED TO PREVAIL |
| image_constraint_token | JUDGED NOT TO LIMIT RESOLUTION OF VIDEO SIGNAL OUTPUT REGARDLESS OF VALUE NOTED |
| retention_mode | PROVISIONAL ACCUMULATION JUDGED AS POSSIBLE REGARDLESS OF VALUE NOTED |
| retention_state | PROVISIONAL ACCUMULATION ALLOWABLE TIME IS JUDGED AS ONE AND HALF HOUR REGARDLESS OF VALUE NOTED |
| encryption_mode | ='1': IN THE CASE WHERE DIGITAL COPY CONTROL INFORMATION IS IN "COPY PERMITTED WITHOUT RESTRAINTS" MODE, HIGH-SPEED DIGITAL INTERFACE OUTPUT IS JUDGED NOT TO BE PROTECTED<br>='0': IN THE CASE WHERE DIGITAL COPY CONTROL INFORMATION IS IN "COPY PERMITTED WITHOUT RESTRAINTS" MODE, HIGH-SPEED DIGITAL INTERFACE OUTPUT IS JUDGED TO BE PROTECTED |

FIG.8

APPLICATION FOR CONTENT PROTECTION

| SERVICE FORM | GENERATION LIMIT USING DIGITAL COPY CONTROL INFORMATION | | | | |
|---|---|---|---|---|---|
| | COPY PERMITTED | COPY PERMITTED (OUTPUT PROTECTED) | LIMITED NUMBER OF COPIES PERMITTED | COPY PERMITTED FOR ONE GENERATION | COPY PROHIBITED |
| PAY-PER-VIEW LICENSE FEE PAID FOR ONE PROGRAM OR SPECIFIED PROGRAM GROUP | APPLICABLE | APPLICABLE | APPLICABLE | APPLICABLE | APPLICABLE |
| MONTHLY OR OTHER TYPE OF PAY BROADCAST FLAT/TIER | APPLICABLE | APPLICABLE | APPLICABLE | APPLICABLE | NOT APPLICABLE |
| FREE PROGRAM WITH CONTENT PROTECTED (FREE CONDITIONAL ACCESS DELIVERY) | APPLICABLE | APPLICABLE | APPLICABLE | APPLICABLE | NOT APPLICABLE |
| MISCELLANEOUS | APPLICABLE | NOT APPLICABLE | NOT APPLICABLE | NOT APPLICABLE | NOT APPLICABLE |

FIG.9

ACCUMULATION (RECORDING) CONTROL BY DIGITAL COPY CONTROL DESCRIPTOR AND CONTENT USE DESCRIPTOR

| DIGITAL COPY CONTROL DESCRIPTOR | | CONTENT USE DESCRIPTOR | | ACCUMULATION (RECORDING) CONTROL |
|---|---|---|---|---|
| copy_control_type | digital_recording_control_data | encryption_mode | digital_recording_control_mode | |
| Don't care | 00 | 1 | Don't care | CAN BE RECORDED AS "COPY PERMITTED WITHOUT RESTRAINTS" |
| | | 0 | Don't care | CAN BE RECORDED AS "COPY PERMITTED WITHOUT RESTRAINTS" ONLY IN ENCRYPTED FORM |
| | 10 | Don't care | 1 | CAN BE RECORDED AS "LIMITED NUMBER OF COPIES PERMITTED" * |
| | | | 0 | CAN BE RECORDED AS "RECOPY PROHIBITED" |
| | 01 | Don't care | Don't care | RECORDING NOT PERMITTED |
| | 11 | Don't care | Don't care | RECORDING NOT PERMITTED |
| NO DESCRIPTOR | | | Don't care | CAN BE RECORD AS "COPY PERMITTED WITHOUT RESTRAINTS" |

* MAY BE RECORDED AS "RECOPY PROHIBITED"

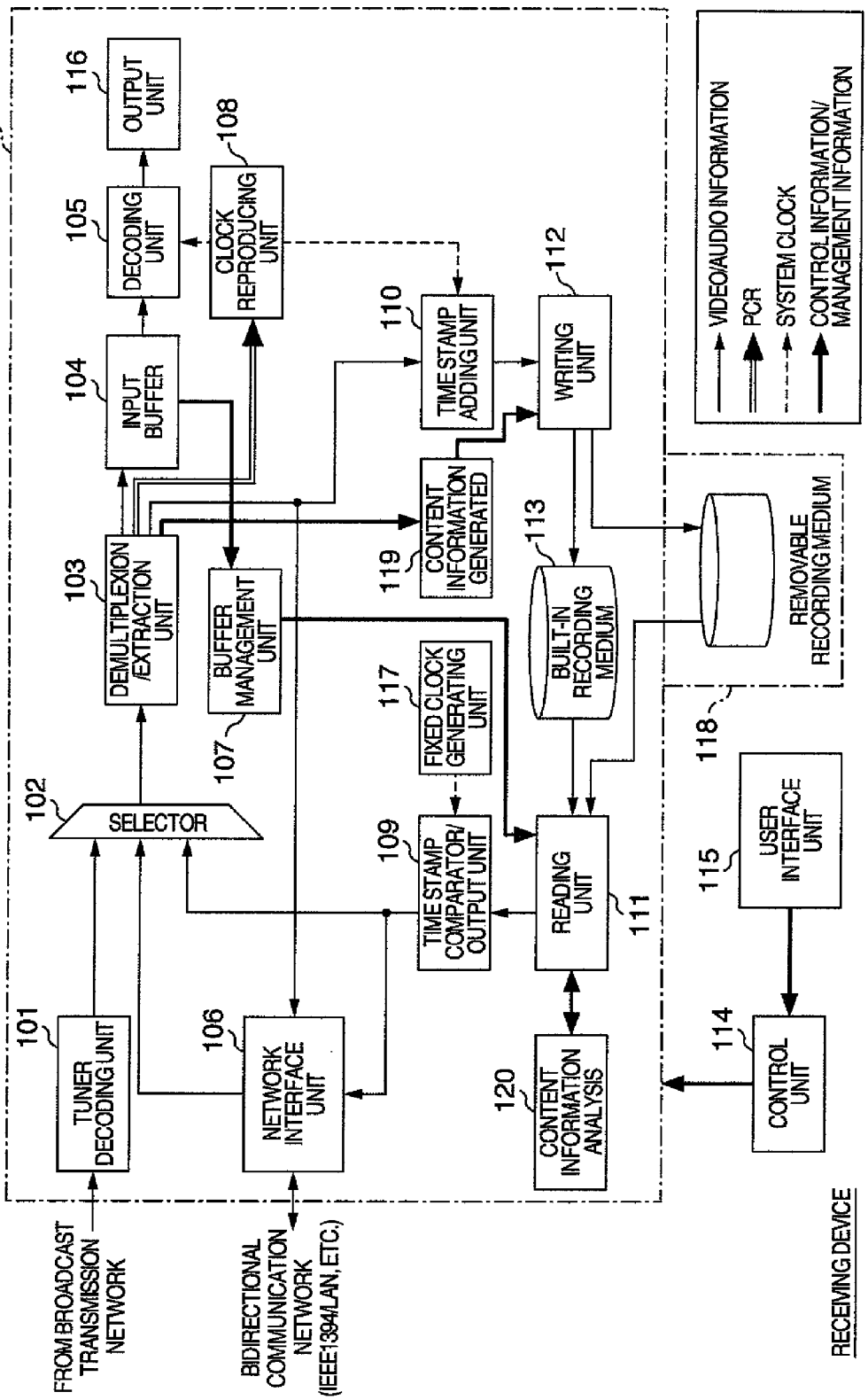

FIG.11

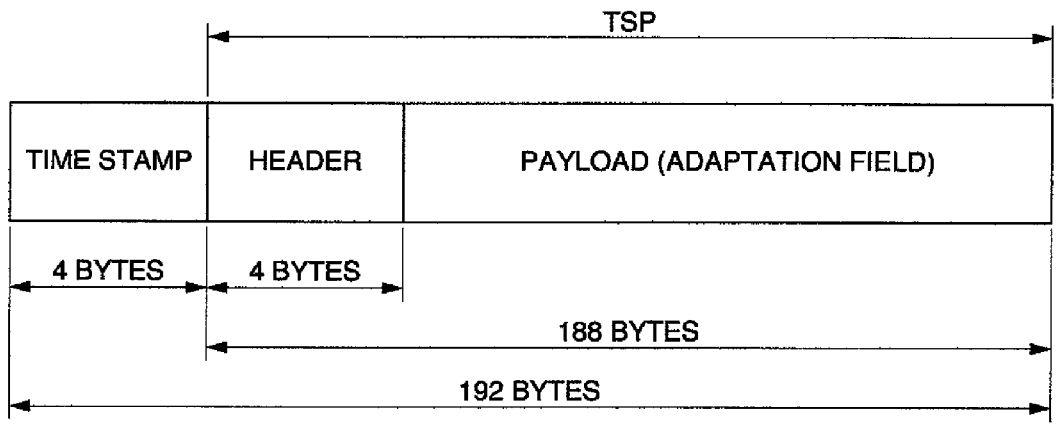

FIG.12

| MANAGEMENT INFORMATION FIELD 501 | | | | | | DATA FIELD 502 |
|---|---|---|---|---|---|---|
| FILE NO.1 | DATE/ TIME 1 | ADDRESS 1 | KEY INFORMATION 1 | COPY INFORMATION | NUMBER OF COPIES | ENCRYPTED DATA 1 |
| FILE NO.2 | DATE/ TIME 2 | ADDRESS 2 | KEY INFORMATION 2 | COPY INFORMATION | NUMBER OF COPIES | ENCRYPTED DATA 2 |
| FILE NO.3 | DATE/ TIME 3 | ADDRESS 3 | KEY INFORMATION 3 | COPY INFORMATION | NUMBER OF COPIES | ENCRYPTED DATA 3 |
| FILE NO.4 | DATE/ TIME 4 | ADDRESS 4 | KEY INFORMATION 4 | COPY INFORMATION | NUMBER OF COPIES | ENCRYPTED DATA 4 |
| | | | | | | |
| FILE NO.n | DATE/ TIME n | ADDRESS n | KEY INFORMATION n | COPY INFORMATION | NUMBER OF COPIES | ENCRYPTED DATA n |
| 503 | 504 | 505 | 506 | 507 | 508 | 509 |

FIG.20

| Retention_Mova_Mode | PROVISIONAL ACCUMULATION AND MOVE MODE |
|---|---|
| Retention_State | PERIOD OF PROVISIONAL ACCUMULATION |
| EPN | EPN ASSERTED COPY FREE |
| DTCP_CCI | COPY CONTROL INFORMATION |
| Copy_count_Mode | COUNT VALID/INVALID |
| Count | NUMBER OF COPIES |
| Image_Constraint_Token | RESOLUTION LIMIT INFORMATION |
| APS | ANALOG PROTECTION |

OUTPUT CONTROL METHOD

INCORPORATION BY REFERENCE

The present application claims priorities from Japanese applications JP2008-275047 filed on Oct. 27, 2008, JP2008-275048 filed on Oct. 27, 2008, JP2008-331864 filed on Dec. 26, 2008 and JP2008-331866 filed on Dec. 26, 2008, the contents of which are hereby incorporated by reference into this application.

BACKGROUND OF THE INVENTION

This invention relates to the content copy control.

With regard to this technical field, JP-A-2002-319227 describes the problem how to "improve the convenience of the operation in which the information permitted to copy only for one generation ("copy one generation") is recorded by being rewritten into the information prohibiting any further copy ("copy no more")" and proposes a solution in which one-generation copy is permitted for a predetermined time after recording ("copy one generation") so that any portion for which recording is suspended due to a recording fault may be complemented. Also, two identical streams are recorded on a medium, one used for normal viewing and the other moved to and held in another medium as required."

SUMMARY OF THE INVENTION

With the recent expansion of the digital broadcast services, a recording device capable of recording the digital broadcast has come to be widely used.

In the recording operation of the digital broadcast, the digital broadcast received is recorded in the HDD (hard disc drive) built in the recording device. This digital broadcast is copied from the HDD to another recording medium (such as an optical disc, a semiconductor memory or another HDD) in the case where the copy of the digital broadcast program is permitted ("copy free"), or moved to another recording medium in the case where the recording of the digital broadcast program is permitted for one generation ("copy one generation" meaning that the copying of a copy (copy for two or more generations) is not permitted).

In the recording device according to JP-A-2002-319227, the digital broadcast program can be copied within a specified time even in "copy one generation" mode, and therefore, the recording, if suspended, can be complemented.

The recording device according to JP-A-2002-319227, however, is not permitted to perform the copy operation after lapse of the specified time as in the other conventional devices of similar kind. In a recording device not adapted to record a program in the HDD while at the same time copying the program from the HDD to an optical disc, for example, the specified time may pass before the copy from the HDD to the optical disc is completed in the case where so many programs are desired to copy that the accesses to the HDD are crowded.

In view of this, the object of this invention is to provide an apparatus and a method for improving the operating convenience while controlling the copy operation in recording a digital broadcast program.

Specifically, according to this invention, there is provided an output control method comprising a receiving step for receiving the copy control information for controlling a digital content and the copy of the digital content, and an output step for outputting the received digital content to a recording medium through a network based on the copy control information received in the receiving step, wherein in the case where the copy control information for the digital content received in the receiving step indicates the permission to produce a predetermined number of copies in one generation, the particular digital content is output in the output step to the recording medium in a form adapted to permit up to the predetermined number of copies to be produced.

According to the method described above, the operating convenience for the contents of a digital broadcast program is improved while controlling the copy thereof in the recording process thereof.

Other objects, features and advantages of the invention will become apparent from the following description of the embodiments of the invention taken in conjunction with the accompanying drawings.

BRIEF DESCRIPTION OF THE DRAWINGS

FIG. 3 shows an example of the structure of the content use descriptor constituting one of the copy control information.

FIG. 4 shows an example of description in each field of the content use descriptor.

FIG. 5 shows an example of the structure of the digital copy control descriptor constituting one of the copy control information.

FIG. 6 shows an example of the information for controlling the copy generation.

FIG. 7 shows an example of the receiving process in the receiving device 3 for each field of the content use descriptor sent out from the transmission device 1.

FIG. 8 shows an example of an application in which the program contents are protected by the transmission device 1 using the copy control information.

FIG. 9 shows an example of the control operation performed in the case where the receiving device 3 accumulates (records) the program contents using the copy control information.

FIG. 10 is a block diagram showing an example of the configuration of the receiving device 3.

FIG. 11 is a diagram showing an example of the transport packet with a time stamp added thereto.

FIG. 12 is a diagram showing an example of recording the program contents in a recording medium.

FIG. 20 is a diagram showing an example of the copy control information for the content data in DTCP (digital transmission content protection).

DETAILED DESCRIPTION OF THE EMBODIMENTS

A preferred embodiment of the invention is explained below. This invention, however, is not limited to this embodiment. This embodiment relates mainly to the handling of the information permitted to copy in one generation.

<System>

Figure 1:
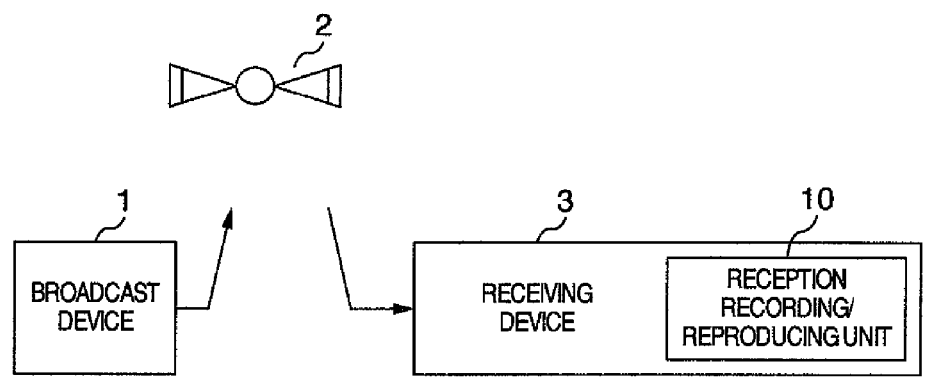
FIG. 1 is a block diagram showing an example of the system configuration.

FIG. 1 is a block diagram showing an example of the system configuration according to this embodiment, and illustrates a case in which the information is transmitted/received by broadcast and recorded/reproduced.

Reference numeral 1 designates a transmission device installed in an information providing station like a broadcast station, numeral 2 a relay device installed in a relay station or a broadcast satellite, numeral 3 a receiving device installed in the home of the user, and numeral 10 a reception recording/reproducing unit built in the receiving device 3. In the reception recording/reproducing unit 10, the broadcast information can be recorded and reproduced.

The transmission device 1 transmits a modulated signal wave through the relay device 2. As shown in FIG. 1, the signal wave can be transmitted alternatively by cable, telephone line, terrestrial broadcast or IP (internet protocol) through a network such as the internet, as well as by the earth satellite. The signal wave received by the receiving device 3, after being demodulated into an information signal, as described later, is recorded as a signal suitable for recording, as required. Also, the user can enjoy the image and sound produced by the information signal on a display, if any, built in the receiving device 3 or, if not so built in, by connecting the receiving device 3 and a display not shown.

<Transmission Device>

Figure 2:
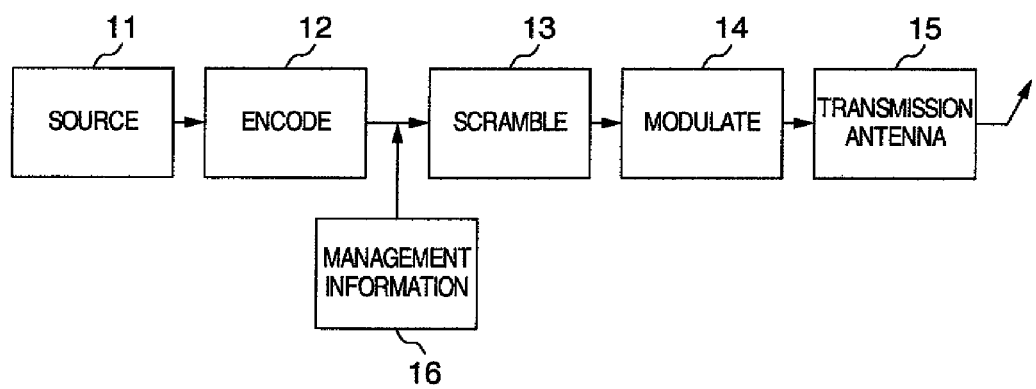
FIG. 2 is a block diagram showing an example of the configuration of a transmission device 1.

FIG. 2 is a block diagram showing an example of the configuration of the transmission device 1 included in the system shown in FIG. 1.

Numeral 11 designates a source generating unit, numeral 12 an encoding unit for compression according to MPEG or H.264 scheme, numeral 13 a scramble unit, numeral 14 a modulation unit, numeral 15 a transmission antenna, and numeral 16 a management information providing unit. The video and audio information generated in the source generating unit 11 configured of a camera, a recording/reproducing device, etc. is compressed in data amount by the encoder unit 12 to make possible the transmission in a smaller occupied band. The scramble unit 13 encrypts the transmitted information, as required, into a form viewable by specified viewers. The information signal, after being modulated into a form suitable for transmission according to such a scheme as OFDM, TC8PSK or QPSK, is transmitted as a radio wave toward the relay device 2 from the transmission antenna 15. In the process, the management information providing unit 16 adds the information such as the present time and the copy control information for controlling the copy operation.

A plurality of pieces of information are often multiplexed on a single radio wave by such a method as time division or spread spectrum. In such a case, though not shown in FIG. 2 to simplify the explanation, a plurality of systems including the source generating unit 11 and the encoder 12 are available, and a multiplexer to multiplex the plurality of the information is inserted between the encoder 12 and the scrambler 13.

<Copy Control Information>

The copy control information, which is for controlling the limitation such as whether the copy is permitted or not and the number of copies permitted, is added by, for example, the management information providing unit 16. This information includes a content use descriptor and a digital copy control descriptor.

FIG. 8 shows an example of an application for protection of the program contents by using the copy control information.

The term "applicable" indicates that the contents corresponding to each service form can be selected at the transmitting end as a generation limit using the digital copy control information. The term "pay-per-view", for example, indicates that any digital copy control information can be used, while the term "pay broadcast monthly, etc." indicates that "copy prohibited" cannot be selected at the transmitting end.

In the expression "flat/tier", the word "flat" means what is called a flat contract concluded collectively for a plurality of channels, and the word "tier" means what is called a tier contract concluded for each channel in a pay broadcast.

The condition "miscellaneous" includes "a program content not protected in other than the pay broadcast".

FIG. 3 shows an example of the structure of the content use descriptor as one of the copy control information. The content use descriptor is generated and added by the management information providing unit 16, for example, and sent out in the form stored in PSI (program specific information) (such as PMT (program map table)) of MPEG-TS, SI (service information) (such as EIT (event information table)) or SDT (service description table).

The content use descriptor is provided (sent out) for describing the control information on the accumulation (record) or the output for a particular program. The content use descriptor indicates that in the case where the 1-bit field of the descriptor "digital_recording_control_mode" (digital copy mode bit) is "1", the recording is possible as "limited number of copies permitted" even in the case where the digital copy control descriptor "digital_recording_control_data explained with reference to FIG. 5 is "copy permitted for one generation". In the case where the particular 1-bit field is "0", on the other hand, the recording is impossible as "limited number of copies permitted".

Incidentally, the content use descriptor is always provided (sent out) in the case where the particular program to be protected as an output. The output protection is indicative of the fact that the high-speed digital interface output of the content in "copy permitted without restrictions" mode is protected using the output protection bit (encryption_mode) of the content use descriptor. In other words, the output from the digital interface or the copy to the recording medium, though encrypted, is not limited in the number of times copied or the generation. In this case, the retransmission to the internet becomes virtually impossible. This mode is also called "copy free with output protection" or EPN (encryption plus non-assertion).

Also, the content use descriptor is always provided (sent out) in the case where the digital copy control information of the particular program is "copy permitted for one generation" and not subjected to "limited number of copies permitted".

FIG. 4 shows an example of the specifics of the description in each field of the content use descriptor.

The term "OxDE" meaning the content use descriptor is noted as "descriptor_tag". Also, the length of the content use descriptor is noted in "descriptor_length". In "digital_recording_control_mode", "0" is noted in the case where the digital copy control information is "copy permitted for one generation" but "limited number of copies permitted" is not applicable, while "1" is noted therein in the case where the digital copy control information is "copy permitted for one generation" and "limited number of copies permitted" is applicable.

In "encryption_mode", "0" is noted in the case where the digital copy control information is "copy permitted without restraints" and the high-speed digital interface output is protected.

In "retention_mode" indicating the provisional accumulation control bit, "0" is noted indicating that the provisional accumulation is possible even in the case where the digital copy control descriptor "digital_recording_control_data" (digital copy control information) is "copy prohibited". The condition "retention_state" indicates the allowable provisional accumulation time, in which "111" is noted meaning that the accumulation is possible for one and half hour. Incidentally, "image_constraint_token", "retention_state" and "encryption_mode" are "1" in the default state.

The number of copies of the contents in "limited number of copies permitted" mode is limited to 10 or less in the total number of copies including those at both the copy source and the copy destination. Also, the function of recording in a removable recording medium or the function of moving through the high-speed digital interface output, if available, is included as the number of copies limited. Specifically, the contents of the copy source and the copy destination, for example, are assumed to be limited in the number of copies or the copy prohibited (recopy prohibited) except for the analog video/audio output and the digital audio output. Within this limit, the contents of the copy source or the copy destination may be moved.

Incidentally, the thumbnail or the like which is used for the sole purpose of content management is not included as copies.

Each field is also described later with reference to FIG. 7 as the process executed at the receiving end.

FIG. 5 shows an example of the structure of the digital copy control descriptor as one of the copy control information. The digital copy control descriptor is generated and added by the management information providing unit 16, for example, and sent out in the form stored in PSI of MPEG-TS (such as PMT) or SI (EIT or SDT, for example).

The digital copy control descriptor indicates the information for controlling the copy generation in the two-bit field of "digital_recording_control_data" (the digital copy control information).

FIG. 6 shows an example of the digital copy control information. The digital copy control information of "00" indicates that the copy is permitted without restraints, "01" the definition by the broadcast corporation, "10" that the copy is permitted in one generation, and "11" that the copy is prohibited. Incidentally, "copy permitted for one generation" indicates that the received broadcast signal, though recordable (first generation copy), cannot be copied after being recorded.

The content use descriptor shown in FIGS. 3 and 4 is also called the copy number limit information, and the digital copy control information shown in FIGS. 5 and 6 the copy generation limit information.

<Receiving Device>

FIG. 10 is a block diagram showing an example of the configuration of the receiving device 3 included in the system shown in FIG. 1. In FIG. 10, the lines indicating the flow of information or PCR (program clock reference) are assumed not in contact with each other at the crossing points thereof, except for the points indicated by a solid circle from which the line branches.

The receiving device 3 receives the digital broadcast or the IP (internet protocol) broadcast through the internet, and records/reproduces it. An explanation is given about a case handling a signal encoded by MPEG (moving picture experts group) as an image compression technique and multiplexed by the MPEG2-TS scheme.

The receiving device 3 includes a reception recording/reproducing unit 10, a control unit 114 (for example, a CPU (central processing unit)) and a user interface unit 115 (such an input device as a keyboard, a mouse or a remote controller).

In this example of the configuration, each part is described as a hardware element. Nevertheless, a part of the component elements may be implemented by software. Also, this configuration is applicable to the transmission/reception of the video or audio contents for specified users in VOD (video on demand) or downloading through the network. These operations also are collectively called the distribution.

The control unit 114 is connected with each part (including the reception recording/reproducing unit 10) of this receiving device through a bus unit and controls the operation of the receiving device as a whole. Also, the control unit 114 receives various instruction signals from the user through the remote controller of the user interface unit 115 or the like, and based on the instruction signal, controls each part connected through the bus unit and thus executes various processes.

The reception recording/reproducing unit 10 includes a tuner decoding unit 101, a selector 102, a demultiplexion/extraction unit 103 (for example, a demultiplexer), an input buffer 104, a decoding unit 105 (for example, a MPEG decoder), a network interface unit 106, a buffer management unit 107, a clock reproducing unit 108, a time stamp comparator/output unit 109, a time stamp adding unit 110, a reading unit 111, a writing unit 112, a built-in recording medium 113, an output unit 116, a fixed clock generating unit 117 (for example, a crystal oscillator), a content management information generating unit 119 and a content management information analysis unit 120.

The built-in recording medium 113 (also called a first recording medium) and a removable recording medium 118 (also called a second recording medium) is a randomly accessible medium such as a hard disc drive (HDD), a semiconductor memory, a magnetic disc, an optical disc or a magnetooptic disc.

The output unit 116 is a display unit such as a CRT (cathode ray tube), a LCD (liquid crystal display) or a PDP (plasma display panel), an audio output unit such as a speaker, or a composite video output terminal which outputs the analog or digital video/audio data to other display devices or the like, an S video output terminal (S terminal) and a D video output terminal (D terminal) (which are analog video output terminals), a HDMI (high definition multimedia interface) output terminal (digital video output terminal) and an optical audio output terminal (digital audio output terminal). In the output unit 116, the decoded video/audio signal is reproduced by the output device such as the display unit/audio output unit. As an alternative, the video/audio content data or the like is output to other display devices or audio reproducing device through an output terminal (for example, HDMI). The video/audio content data from this output terminal are output in a form based on the content protection method of each output standard, and therefore, the contents are protected.

The tuner decoding unit 101 receives the digital broadcast signal transmitted from the transmission device 1 through a broadcast transmission network such as radio wave (by satellite or terrestrial wave) or cable. The physical or virtual channel frequency designated through the user operating unit such as the remote controller of the user interface unit 115 and the control unit 114 is selected and detected. Also, the MPEG2-TS (transport stream) on which the digital demodulation and the error correction process have been executed is output to the selector 102.

The selector 102 executes the selection process on three-input one-output basis under the control of the control unit 114, and outputs the result to the demultiplexion/extraction unit 103.

In the demultiplexion/extraction unit 103, the transport packet of the channel (program) designated through the user operating unit such as the remote controller of the user interface unit 115 and the control unit 114 is demultiplexed/extracted from the input MPEG2-TS, and the transport packet thus demultiplexed/extracted is output to the time stamp adding unit 110 and the network interface unit 106. Also, the demultiplexion/extraction unit 103 separates/extracts the audio/video PES (packetized elementary stream) or ES (elementary stream) from the transport packet of the channel (program) designated through the user operating unit such as the remote controller of the user interface unit 115 and the control unit 114, and the result of demultiplexion/extraction is output to the input buffer 104.

The ES is defined as each of the video/audio data encoded by compression, and the PES as the video ES or the audio ES packetized by being divided into an appropriate size. Also, the demultiplexion/extraction unit 103 extracts the PCR (program clock reference) from the transport packet of the channel (program) designated by the user operating unit such as the remote controller of the user interface unit 115 and the control unit 114, and outputs the result of extraction to the clock reproducing unit 108.

In the demultiplexion/extraction unit 103, the title and the starting/ending date/time of the channel (program), the copy generation control information and the information whether a plurality of copies are permitted or not recorded in the built-in recording medium 113 or the removable recording medium 118 are detected from the transport packet of the channel (program) designated through the user operating unit such as the remote controller of the user interface unit 115 and the control unit 114. Further, the encryption key of the data is created and output to the content management information generating unit 119. The and the starting/ending date/time of the program, the copy generation control information and the information indicating whether a plurality of copies are permitted or not are stored in, for example, the PSI of MPEG-TS or the SI information and sent out from the transmission device 1.

The input buffer 104 temporarily stores the video/audio PES or ES from the demultiplexion/extraction unit 103. In the decoding unit 105, the DTS (decoding time stamp)/PTS (presentation time stamp) corresponding to the PES or ES stored in the input buffer 104 is compared with the STC (system time clock) count value from the clock reproducing unit 108, and by thus taking the timing for decode/display operation, the video/audio PES or ES stored in the input buffer 104 is retrieved and decoded. The decoded video/audio information is output to the output unit 116.

The buffer management unit 107 monitors the amount of the transport packets not processed in the decoding unit 105 of the input buffer 104, and in accordance with this amount, controls the start and stop of the read operation of the reading unit 111.

The clock reproducing unit 108, using the PCR, reproduces, for example, the system clock of a receiver having the frequency coincident with the system clock of the coding/multiplexing unit of the transmission device 1 not shown. The system clock thus reproduced is output to the STC counter in the clock reproducing unit 108, the time stamp adding unit 110, etc. Also, the STC count value of the STC counter operating in accordance with the system clock thus reproduced is output to the decoding unit 105.

In the time stamp adding unit 110, the time stamp is generated by the counter operating based on, for example, the system clock reproduced by the clock reproducing unit 108 or a crystal oscillator not shown, and each transport packet demultiplexed/extracted by the demultiplexion/extraction unit 103, with the time stamp added thereto, is output to the writing unit 112.

FIG. 11 shows an example of the structure of the transport packet with the time stamp added thereto. The transport packet (TSP) having the length of 188 bytes according to the MPEG standard has a four-byte time stamp (indicating, for example, the time point when the receiver has received the transport packet) added at the head thereof and thus forms a packet having the length of 192 bytes. The time stamp holds the time stamp information as of the time of arrival of the particular transport packet. The TS based on the MPEG standard includes the four-byte header and the following 184-byte payload (or the adaptation field).

The content management information generating unit (content information generating unit) 119 generates the management information based on the title, the program starting/ending date/time, the copy generation control information and the copy number control information (indicating whether the production of a plurality of copies is permitted or not) from the demultiplexion/extraction unit 103, and outputs the management information thus generated to the writing unit 112. As the management information based on the copy generation control information and the copy number control information, the content use descriptor and the digital copy control descriptor explained with reference to FIGS. 3 to 6 received from the transmitter 1 may be used as they are, or based on these information, new information may be generated.

In the writing unit 112, the management information generated by the content management information generating unit 119 and the cipher data on the transport packet encrypted, based on the key information in the management information, with the time stamp added thereto by the time stamp adding unit 110, are recorded in the built-in recording medium 113 or the removable recording medium 118. As a result, one stream having the cipher data on a plurality of transport packets encrypted with the time stamp added thereto and containing the video/audio data of a given channel (in other words, a given program content or a downloaded content), is stored in the built-in recording medium 113 or the removable recording medium 118 as one data file or two or more segments of the particular data file.

Incidentally, the time stamp can also be considered as the temporal information on the temporal position of the transport packet with the particular stamp added thereto. The time stamp, therefore, can be considered as a time difference with either the time point at which the transport packet is input from the demultiplexion/extraction unit 103 to the time stamp adding unit 110 or a reference transport packet (as an example, the immediately preceding or the most front transport packet). This time stamp, as described above, is different from the time stamp (such as PCR, DTS or PTS) contained already in the transport packet.

FIG. 12 shows an example in which the program contents are recorded in the built-in recording medium 113 or the removable recording medium 118.

The management information indicating the program contents and the data (such as the video/audio signal) constituting the substance of the program contents are recorded, for each program content, in the management information area 501 and the data area 502, respectively. The information recorded as the management information contains, for example, the file number 503 indicating the title of the program content, the date/time 504 indicating the starting/ending date/time of the program, the head address and the record size 505 of the data area, the copy information 507, the copy number 508 and the key information 506. The program content is written in the data area 502 from the address corresponding to the head address 505 recorded in the management information area 501. Each time a new program content is recorded, file No. 1, file No. 2, . . . , file No. n, the management information and the program content are recorded sequentially.

The copy information 507 is the copy generation control information contained in the management information generated by the content management information generating unit 119, and may be designated in two bits, for example, as shown below.

00=Copy permitted ("copy free")
10=Record permitted for one generation ("copy one generation")
11=Copy prohibited ("copy never")

Then, in the receiving device 3, the program content recorded in "copy one generation" mode and copied once with 01="copy one generation" cannot be copied any more ("no more copies"). The same designation method may be employed as the digital copy control information explained with reference to FIG. 6 or the method applicable uniquely to the receiving device 3 may be employed.

The copy number 508 is the copy number control information contained in the management information generated by the content management information generating unit 119. The copy number 508 is the information generated based on both the copy generation control information received from the demultiplexion/extraction unit 103 by the content management information generating unit 119 and the information indicating whether a plurality of copies are permitted or not. In the case where the copy generation control information is "record permitted for one generation" ("copy one generation") and the information indicating whether a plurality of copies are permitted or not is "yes", then the program content is recorded as "no more copies", and by storing the information indicating the number of copies permitted to make the copy possible in the same or different format in the same or different recording media, "9" is input, for example, indicating that nine copies are permitted. This numerical value may be based on a standard or the like. In the case where the copy generation control information is "record permitted for one generation" ("copy one generation") and the information indicating whether a plurality of copies are permitted or not is "no", on the other hand, the program content is recorded as "no more copies", and "0" (meaning that no copy is permitted) is input as the information indicating the number of copies permitted to prohibit the copy.

Incidentally, the data constituting the substance of the program content as "copy one generation" and recorded as "no more copies", i.e. the copy generation control information sent from the transmission device 1 and stored in PSI of MPEG-TS or SI and the information indicating whether a plurality of copies are permitted or not are not changed.

Also, the copy information 507, the copy number 508 and the key information 506 are encrypted, for example, not to be illegally altered.

Returning to FIG. 10, the content management information analysis unit 120 reads, through the reading unit 111, the management information stored in the built-in recording medium 113 or the removable recording medium 118, and analyzes the specifics of the management information. Then, the title of the program content and the program starting/ending date/time, the copy information and the number of copies are delivered to the control unit 114 so that the program content can be selected through the control unit 114 and the user operation unit such as the remote controller of the user interface unit 115 to reproduce, copy or move the program content stored in the built-in recording medium 113 or the removable recording medium 118. Also, the key information for decoding the encrypted data is delivered to the reading unit 111.

The reading unit 111, controlled through the buffer management unit 107 or the control unit 114, reads the management information from the built-in recording medium 113 or the removable recording medium 118, and outputs the management information thus read to the content management information analysis unit 120. Then, the reading unit 111 reads the cipher data from the built-in recording medium 113 or the removable recording medium 118 sequentially, and based on the key information delivered from the content management information analysis unit 120, outputs, to the time stamp comparator/output unit 109, the transport packet with the cipher data decrypted and with the time stamp added thereto.

In the time stamp comparator/output unit 109, the count value on the counter operated based on the fixed clock reproducing unit 117 of a crystal oscillator or the like is compared with the time stamp of the transport packet read by the reading unit 111 and with the time stamp added thereto. In the case of coincidence with each other, the time stamp is deleted (removed) from the transport packet, and the transport packet is output to the selector 102 and the network interface unit 106. Incidentally, as long as the residual capacity of the input buffer 104 is monitored by the management unit 107 and the reading unit 111 is controlled in accordance with the residual capacity as in the aforementioned case, the time stamp may be deleted from the transport packet without making comparison between the count value and the time stamp, and the transport packet may be output to the selector 102 and the network interface unit 106. Especially, this output method is preferably used at time of reproduction other than normal reproduction (one-time speed reproduction).

The network interface unit 106 is connected with other devices (a recorder, a display, a personal computer, etc. in home, or a server outside) constituting an output destination/input source through a line (IEEE1394 cable, LAN cable or radio wave). Then, the network interface unit 106 receives the video/audio transport packets with the time stamp deleted by the time stamp comparator/output unit 109 or the transport packets demultiplexed/extracted by the demultiplexion/extraction unit 103, converts these transport packets into the form meeting the transmission standard through the line. After that, the video/audio data stored in the built-in recording medium 113 and the removable recording medium 118 or the video/audio data of the digital broadcast signal received by the tuner decoding unit 101 are output to the other devices constituting the output destinations. Also, the video/audio data are input to the network interface unit 106 in the form meeting the transmission standard from other devices constituting the input destinations through the line, and by being converted into transport packets, output to the selector 102. Incidentally, a plurality of network interface units 106 may be provided.

<Receiving and Recording Process for Copy Control Information>

An explanation is given about a detailed example of the process executed by the receiving device 3 related to the copy control information sent out from the transmission device 1 and explained with reference to FIGS. 3 to 6.

FIG. 7 shows an example of the process executed on each field of the content use descriptor in the receiving device 3.

In the case where "descriptor_tag" is "0xDE", the particular descriptor is judged as the content use descriptor. From "description_length", the length of the content use descriptor is determined. In the case where "digital_recording_control_mode" is "1" and the digital copy control information "copy permitted for one generation", the condition "limited number of copies permitted" is judged as applicable. In the case where "digital_recording_control_mode" is "0" and the digital copy control information is "copy permitted for one generation", on the other hand, the condition "limited number of copies permitted" is judged as inapplicable. Regardless of what value is input in "image_constraint_token", it is judged that the resolution of the video signal output is not limited. Regardless of what value is input in "retention_mode", the provisional accumulation is judged as possible. Regardless of what value is input in "retention_state", the allowable provisional accumulation time is judged as one and half hour. In the case where "encryption_mode" is "1" and the digital copy control information is "copy permitted without restraints", then it is judged that the high-speed digital interface output is not protected. In the case where "encryption_mode" is "0" and the digital copy control information is "copy permitted without restraints", on the other hand, it is judged that the high-speed digital interface output is protected.

Incidentally, in the case where the content use description is not arranged (sent out) for some reason, each field may be interpreted to have the following values. That is, "digital_recording_control_mode"="1", "image_constraint_token"=1, "retention_mode"=0, "retention_state"=111, and "encryption_mode"=1.

FIG. 9 shows an example of the control operation in which the receiving device 3 accumulates (records) the program contents using the copy control information.

FIG. 9 specifically shows that in the case where the digital copy control descriptor "digital_recording_control_data" is "10" and the condition "copy permitted for one generation" prevails, the program contents are accumulated with the copy control information on the recording medium as "recopy prohibited". In the case where "digital_recording_control_mode" is "1", however, the program contents are accumulated in "limited number of copies permitted" mode. Incidentally, also in the case where the program contents are accumulated in "recopy prohibited" mode, the value of the digital copy control descriptor "digital_recording_control_data" need not be changed.

Also, in the case where the digital copy control descriptor "digital_recording_control_data" is "10" in "copy permitted for one generation" mode, a plurality of copies cannot be produced. However, the accumulation for the purpose of backup in the area inaccessible by the user is permitted. This restraint is imposed on each broadcast receiving unit, and in the presence of a plurality of broadcast receiving units, the restraint is imposed on each receiving unit for one broadcast session.

With regard to the condition "limited number of copies permitted", N copies can be generated from the program contents accumulated as "limited number of copies permitted". The value N may be based on, for example, an appropriate standard. As far as the number of copies can be determined by use of the move function, etc., copies may be produced through the high-speed digital interface output. A case in which the interface is IEEE1394 and the output destination is recognized as a device meeting the DTCP standard is an example. Incidentally, the copies produced in this way are in the state equivalent to those in "limited number of copies permitted" mode.

Also, in the case where the program contents accumulated as "limited number of copies permitted" are reproduced and output, the high-speed digital interface executes the process of "no more copies" specified in DTCP (digital transmission content protection) in advance. The analog video output and the digital audio output can be produced as "copy permitted for one generation".

The total number of copies of the contents in "limited number of copies permitted" mode is limited to not more than ten including the copy source and the copy destination. Also, the number of copies limited includes the function of recording, if any, in the removable recording medium or the function of moving, if any, through the high-speed digital interface output. Specifically, with regard to the contents of the copy source and the copy destination, for example, the number of copies is limited or the copy is prohibited (recopy prohibited) except for the analog video output, the audio output and the digital audio output. Within the limit described above, the contents at the copy source or the copy destination may be moved.

With regard to the contents recorded (accumulated) as "limited number of copies permitted", the copies through the digital record (copy) in the recording medium and the high-speed digital interface output can be generated up to nine in addition to the original content stored (accumulated), except for the backup recording (accumulation) in an area inaccessible by the user at the time of or after recording. The original content after generating a specified number (nine) of copies can be moved in similar manner to the content of "recopy prohibited".

With regard to the contents recorded (accumulated) as "limited number of copies permitted", the whole or a part of the copies managed in the recording medium adapted for "digital_recording_control_mode" built in or digitally connected can be moved. In this case, however, the total number of copies is kept unchanged before and after the move.

The management of the number of copies of the contents in "limited number of copies permitted" mode destined to the built-in recording medium and through the high-speed digital interface is equivalent to the management in a case in which there exist ten movable contents. Also, the analog video output and the digital audio output can be produced as "copy permitted for one generation" and not subject to the limit of the number of copies.

The contents can be recorded in the removable recording medium as "limited number of copies permitted" as long as the number of copies equivalent to the case described above can be managed.

With regard to the contents in "limited number of copies permitted" mode, the total number of the movable contents is kept unchanged before and after the move in the case where all or a part of the copies managed by the moving source is moved. Specifically, assuming that there are ten movable contents before the move, and four of them are moved, six movable contents are held in the moving source. Incidentally, the content such as the thumbnail used only for the purpose of content management is not included as copies. In addition to the thumbnail generated from the video information, the audio information and the credit information, for example, may be used for the purpose of content management.

Figure 18:
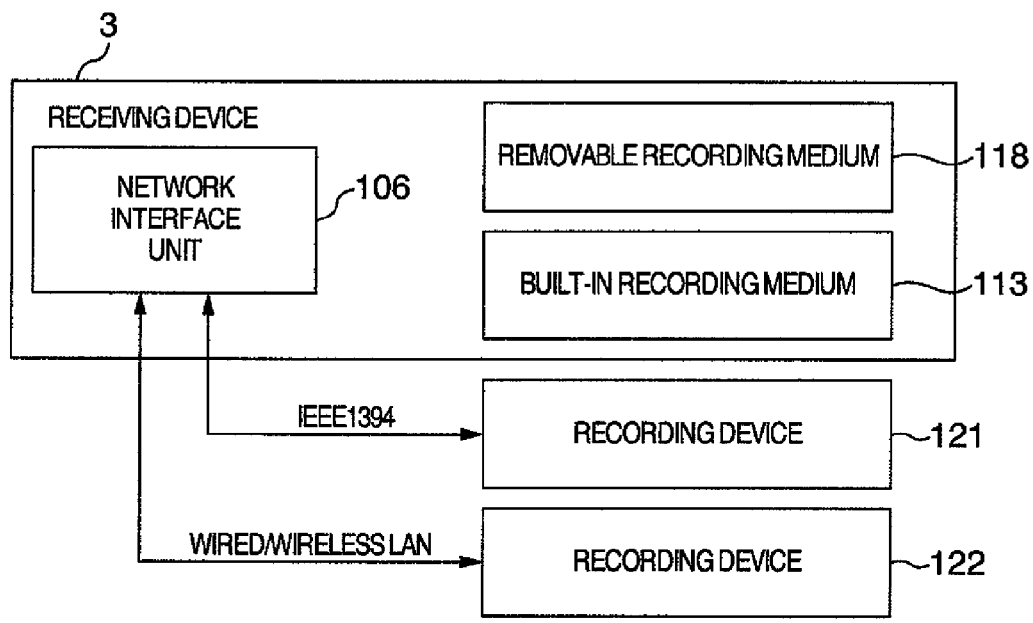
FIG. 18 is a diagram showing the limit of the number of copies.

FIG. 18 is a diagram for understanding the limit of the number of copies explained above. This circuit includes a receiving device 3, a network interface unit 106, a built-in recording medium 113, a removable recording medium 118, a recording device 121 and a recording device 122. The recording device 121 is connected through, for example, the network interface unit 106 and the IEEE 1394, and DTCP is used as a copyright protection method. The recording device 122 is connected, for example, to the network interface unit 106 through the wired LAN or the wireless LAN, and DTCP-IP (digital transmission content protection over internet protocol) is used as a copyright protection method. In the case where the components are connected in this way, for example, the contents in "limited number of copies permitted" mode received from the broadcast wave and stored in the built-in recording medium 113, the removable recording medium 118, the recording device 121 and the recording device 122 are required not more than ten in total.

In this case, for example, the content adapted to produce four copies is stored in the built-in recording medium 113, the content adapted to produce two copies in the removable recording medium 118, one content in the recording device 121 and one content in the recording device 122. The broadcast wave received may be recorded in the built-in recording medium 113, the removable recording medium 118, the recording device 121 and the recording device 121 at the same time to reach the number described above. As an alternative, the contents are first recorded only in the built-in recording medium 113, followed by being copied to the removable recording medium 118, the recording device 121 and the recording device 122.

Figure 19:
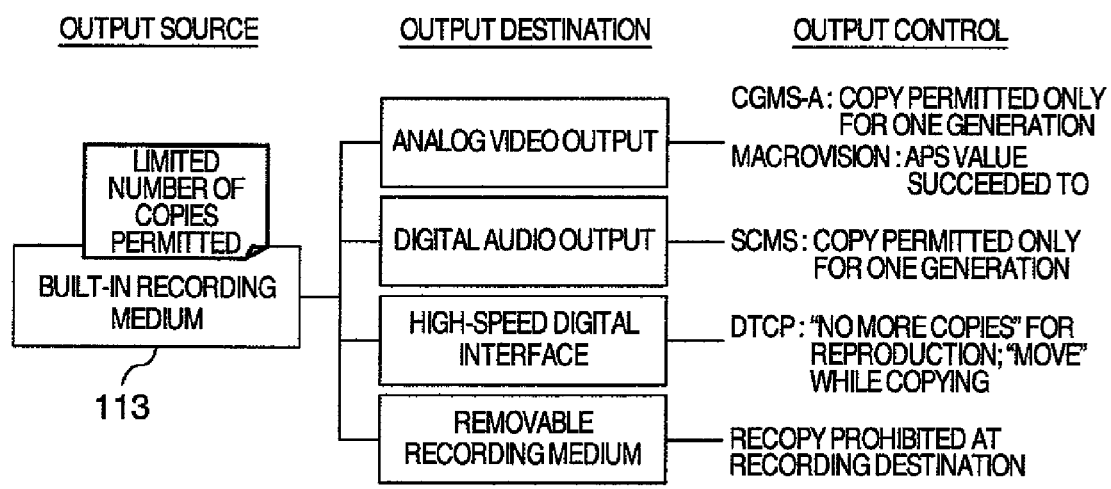
FIG. 19 is a diagram showing a typical output destination of the contents accumulated in "limited number of copies permitted" mode and the copy control operation in the output destination.

FIG. 19 is a diagram to facilitate the understanding of a typical output destination of the contents accumulated as "limited number of copies permitted" and the control operation thereof. The output source is, for example, the built-in recording medium 113 of the reception recording/reproducing unit 10. At the output unit 116, the analog video output (composite video output terminal, S terminal, D terminal, etc.) uses, as copy control means, CGMS-A (copy generation management system (analog)) and Macrovision. In the control operation by CGMS-A, the copy is permitted for only one generation, while the macrovision control operation succeeds to the value of APS (analog protection system). The digital audio output (optical audio output terminal, etc.) uses, as a copy control means, SCMS (serial copy management system) to permit the copy for only one generation. Also, the high-speed digital interface (IEEE1394 terminal, etc.) in the network interface unit 106 uses, as a copy control means, DTCP (digital transmission content protection). This control operation is such that "no more copies" is set for reproduction, and "move" for copying. The removable recording medium 118 controls the copy by prohibiting the recopy operation at the recording destination.

By performing appropriate control operations for different output destinations as described above, the same program can be recorded a plurality of times in a plurality of recording media or recording devices at the time of receiving and recording the broadcast wave. Thus, the convenience on the part of the user can be improved while at the same time protecting the contents.

Although the recording devices 121, 122 are explained above as connected through the IEEE1394 and LAN, respectively, the connecting means are not necessarily limited to IEEE1394 and LAN, and other connection methods may be used.

As described above, in the case where the contents managed as "limited number of copies permitted" are moved while holding the number of copies managed in the recording medium digitally connected, the total number of copies before and after the move is required to be kept unchanged. One method is explained below. In the case where the TS packets are transmitted according to DTCP-IP, "DTCP_descriptor" including the copy control information of the contents is set (added) in PMT. FIG. 20 is a diagram showing an example of the "DTCP_descriptor". "DTCP_descriptor" includes "retention_move_mode" indicating whether the provisional accumulation or the moving mode of the digital stream is specified or not, "retention_state" indicating the period of provisional accumulation, "DTCP_CCI" (DTCP_copy control information) indicating whether the copy of the digital stream in MPEG2-TS form is permitted or not, EPN indicating whether the copy free mode which may be indicated by "DTCP_CCI" is the "EPN asserted free" or not, "count" indicating the number of copies permitted, "count" indicating the number of copies permitted, "copy_count_mode" indicating whether the count information is valid or not, "Image_Constraint_Token" indicating whether the resolution is limited or not in the reproduction output of the digital stream in MPEG2-TS form, and APS (analog protection system) indicating whether the analog output is protected or not in the case where the digital stream in MPEG2-TS form is output by analog conversion. As described above, "DTCP_descriptor" is transmitted after being set (added or attached) in PMT and stored in the TS packet. In transmitting other contents than MPEG2-TS such as MPEG2-PS, however, the copy control information of the content data described above may be stored in the packet added as another packet than the transmission contents defined according to the DTCP-IP standard. Of course, the copy control information of the content data may be stored in another packet than the transmission packet also in the transmission according to MPEG2-TS.

By using the "Copy_count_Mode" information both at the transmitting and receiving ends as described above, the contents managed as "limited number of copies permitted" can be recorded in a recording medium, digitally connected through the wired/wireless LAN, in such a manner that the particular contents can be moved while holding the number of copies managed, thereby improving the convenience of the user while at the same time protecting the contents.

Specifically, by using the information of "Copy_count_Mode" and "Count" with the DTCP-IP standard extended, the contents managed as "limited number of copies permitted" can be recorded in a recording medium, digitally connected through the wired/wireless LAN, in such manner that the particular contents can be moved while holding the managed number of copies as it is.

Further, consider a case in which by using the information of "Copy_count_Mode" and "Count" with the DTCP-IP standard extended, the contents received as "limited number of copies permitted" are output as they are (live broadcast output) through the wired/wireless LAN. Then, the contents can be output as "copy permitted for one generation" to a plurality of devices (in a range not exceeding the number of copies limited in the contents for "limited number of copies permitted") connected to LAN. In the case where the number of devices connected is limited according to DTCP-IP standard, the particular limitation is followed.

As an alternative, by limiting the number of the destination device connected by LAN to one, the contents can be output as "limited number of copies permitted". Which output is selected may be determined according to an applicable standard, if any.

As described above, by using the information of "Copy_count_Mode" and "Count" at both the transmitting and receiving ends, the contents can be output as "limited number of copies permitted" in the live broadcast and recorded in a recording medium digitally connected by wired/wireless LAN. In the process, the contents can be output to a plurality of devices (in a range not exceeding the number of copies limited in the contents as "limited number of copies permitted") connected by LAN as "copy permitted for one generation", or only to a single destination device connected by LAND as "limited number of copies permitted". In this way, the convenience of the user is improved while at the same time protecting the contents.

Further, consider a case in which by using the information of the information of "Copy_count_Mode" and "Count" as an extension of the DTCP-IP standard, the contents in "limited number of copies permitted" mode are recorded as "limited number of copies permitted" in the recording medium built in the receiver while at the same time being output as a live broadcast to the devices connected to LAN. In such a case the contents can be output as "copy permitted for one generation". In the case where the contents in "limited number of copies permitted" mode are output in a live broadcast to the devices connected by LAN without being recorded in the recording medium built in the receiver, the particular contents can be output as "limited number of copies permitted".

Consider a case where the contents in the form "limited number of copies permitted" are recorded as "copy permitted for one generation" in the recording medium built in the receiver and output as a live broadcast to the devices connected by LAN. In this case, the contents can also be output as "limited number of copies permitted". A standard, if any, is followed.

As described above, by using the information of "Copy_count_Mode" and "Count" at both the transmitting and receiving ends, the contents in the form "limited number of copies permitted" can be output as a live broadcast and recorded in a recording medium digitally connected by wired/wireless LAN or the like in accordance with the recording condition in the recording medium built in the receiver. Thus, while improving the convenience of the user, the contents can be protected.

Also, consider a case in which by using the information of "Copy_count_Mode" and "Count" as an extension of the DTCP-IP standard, the received contents in the form "limited number of copies permitted" are output as a live broadcast through the wired/wireless LAN without being accumulated. In such a case, a plurality of destination devices connected by LAN can be connected and the copies can be dividedly output. The total number of copies is limited to 10.

As described above, by using the information of "Copy_count_Mode" and "Count" at both the transmitting and receiving ends, the received contents in the form "limited number of copies permitted" can be output as a live broadcast and recorded in a recording medium digitally connected by wired/wireless LAN, etc. in such a manner that a plurality of the destination devices connected by LAN can be connected and the copies can be dividedly output to each device. In this way, the convenience of the user is improved while at the same time protecting the contents.

The contents in the form "limited number of copies permitted" accumulated as "limited number of copies permitted" in the recording medium built in the receiver can be output (moved) as "limited number of copies permitted" to a single limited destination device connected by LAN using the information of "Copy_count_Mode" and "Count" as an extension of the DTCP-IP standard.

As described above, by using the information of "Copy_count_Mode" and "Count" at both the transmitting and receiving ends, the contents accumulated as "limited number of copies permitted" can be output (moved) to a single limited destination connected by LAN as "limited number of copies permitted". In this way, the convenience of the user is improved while at the same time protecting the contents.

In the foregoing description, "Count" indicating the number of copies permitted and "Copy_count_Mode" indicating whether the "Count" information is valid or not are used. Nevertheless, only the "Count" indicating the number of copies permitted can be used free of any problem without using "Copy_count_Mode".

In the case where the recording medium is a removable one, another limit is imposed in addition to the one shown in FIG. 9. With regard to the digital recording of the program contents in the removable recording medium, consider the digital recording of TV, the data service or the audio service. In the case where the program content with the digital copy control descriptor "digital_recording_control_data" of "10" with "copy permitted for one generation" is received for recording, three or more copies of the received content cannot be produced even in the first generation (for example, a broadcast program received cannot be recorded in three or more recording media at the same time). This value (three or more in this example) may be determined so as to conform to a standard, for example. Also, a plurality of copies of the same generation with the same recording format cannot be produced, except for the backup digital recording in an area inaccessible by the user. The limit of recording in the digital recording medium is imposed for each broadcast receiving unit, and in the presence of a plurality of broadcast receiving units, the particular limit is imposed on each of the broadcast receiving units. In the case where the receiving device has a recording format or a recorded content protection scheme not adapted to "digital_recording_control_mode", the program content having the digital copy control descriptor "copy_control_type of "01", "digital_recording_control_data" of "10" and the content use descriptor "digital_recording_control_mode" of "1" are digitally recorded as "copy permitted for one generation" (digital_recording_control_mode="0").

In the case where the recording format and the recorded content protection method adapted for "digital_recording_control_mode" are available, the content having the digital copy control descriptor "copy_control_type" of "01", "digital_recording_control_data" of "10" and the content use descriptor "digital_recording_control_mode" of "1" can be recorded as "limited number of copies permitted". However, the recording at the same time as accumulation is prohibited.

Figure 13:
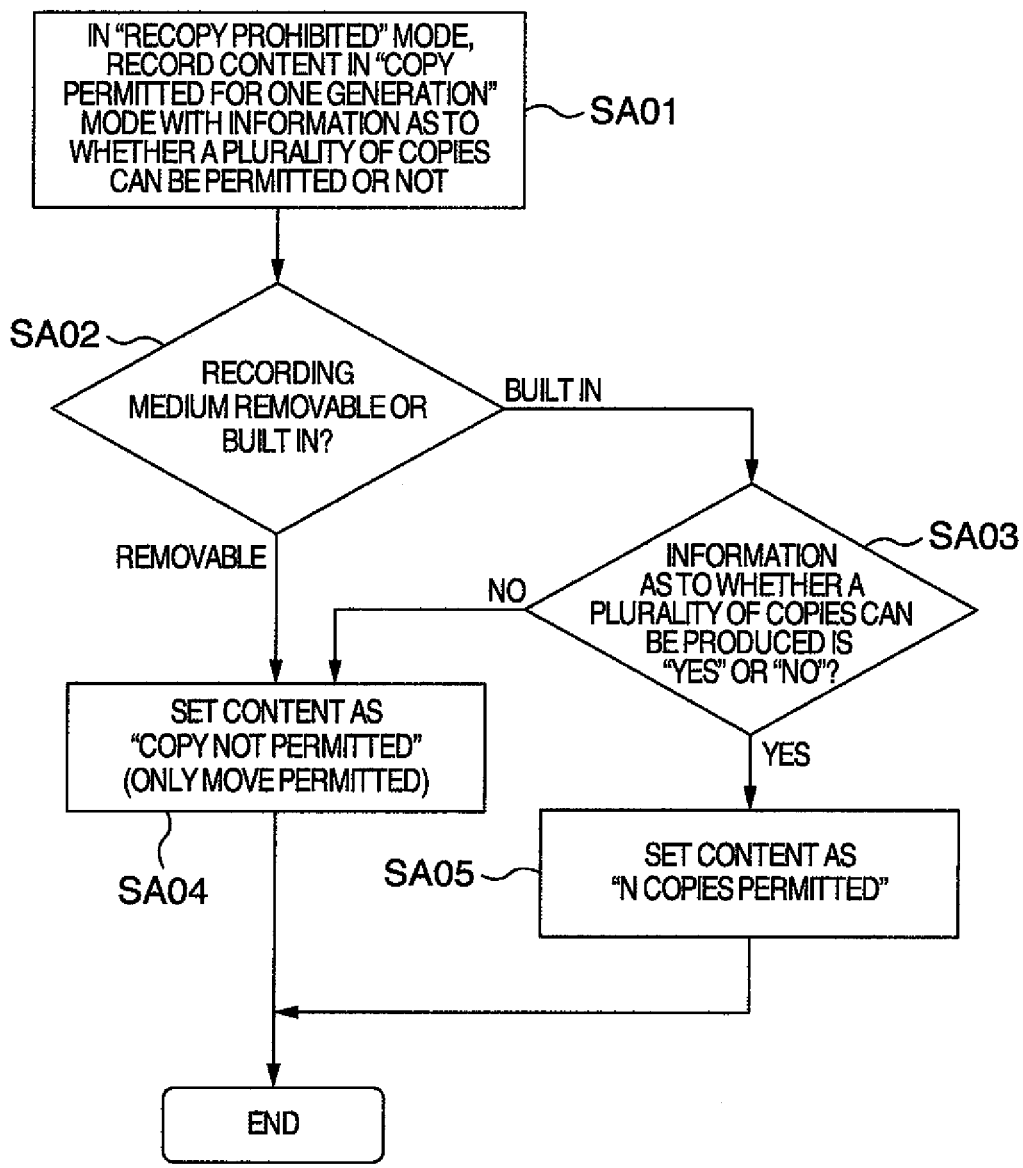
FIG. 13 is a flowchart showing an example of steps of generating the copy information in the management information and the number of copies in recording the program content permitted to copy for one generation.

FIG. 13 is a flowchart showing an example of steps of generating the number of copies and the copy information included in the management information for the receiving device 3 recording the program content in "copy permitted for one generation" mode ("copy one generation").

Assume that based on the copy generation control information and the information indicating whether a plurality of copies can be produced or not and obtained from the demultiplexion/extraction unit 103, the content management information generating unit 119 recognizes that the program content is in the form "copy permitted for one generation" ("copy one generation") and has added thereto the information indicating whether a plurality of copies can be produced or not. Then, the content management information generating unit 119 inputs "01" to the copy information of the management information to the effect that no more copies can be produced, i.e. "recopy prohibited" ("no more copied") (SA01).

The control unit 14 notifies to the content management information generating unit 119, for example, whether the recording medium for recording the program content is built in or removable.

In the case where the recording medium is removable, "0" may be input, for example, as the number of copies in the management information, and thus a state is set in which the program content cannot be copied but can be moved (SA04). Incidentally, the relation with the aforementioned application not permitting three or more copies is that the aforementioned case is the copy control when a broadcast is received and recorded (at the time of generation of the first generation copy), while the explanation of FIG. 13 is different in that it concerns the copy control after recording in the recording medium (after generation of the first generation copy).

In the case where the recording medium is built in, the content management information generating unit 119 judges whether the information indicates "yes" or "no" in the possibility of producing a plurality of copies (SA03).

In the case where the answer is "no", "0" is input, for example, as the number of copies of the management information, thereby setting a state in which the program content cannot be copied but can be moved (SA04). Of course, the content can alternatively be deleted.

In the case where the answer is "yes", on the other hand, "N" is input as the number of copies in the management information, thereby leading to a state in which N copies of the program content can be produced (SA05).

By doing so, a program content already recorded and permitted to copy for one generation ("copy one generation") can be copied in a plurality of numbers at any time, thereby improving the operating convenience. Further, the possibility or impossibility of producing a plurality of copies is judged according to whether the recording medium is built in or removable. In the case where the recording medium is built in, as explained above, the program content is locally encrypted, and further, the key information, the copy information and the number of program copies are managed by encryption thereby to avoid the illegal alteration. In the case where the recording medium is removable, on the other hand, various management methods are employable, and in some cases, the contents cannot be managed in the same manner as the foregoing case in which the recording medium is built in. Therefore, the illegal alteration may not be avoided. In view of this, this embodiment improves the convenience of the user while at the same time protecting the contents.

<Copy Process Related to Copy Control Information>

Figure 14:
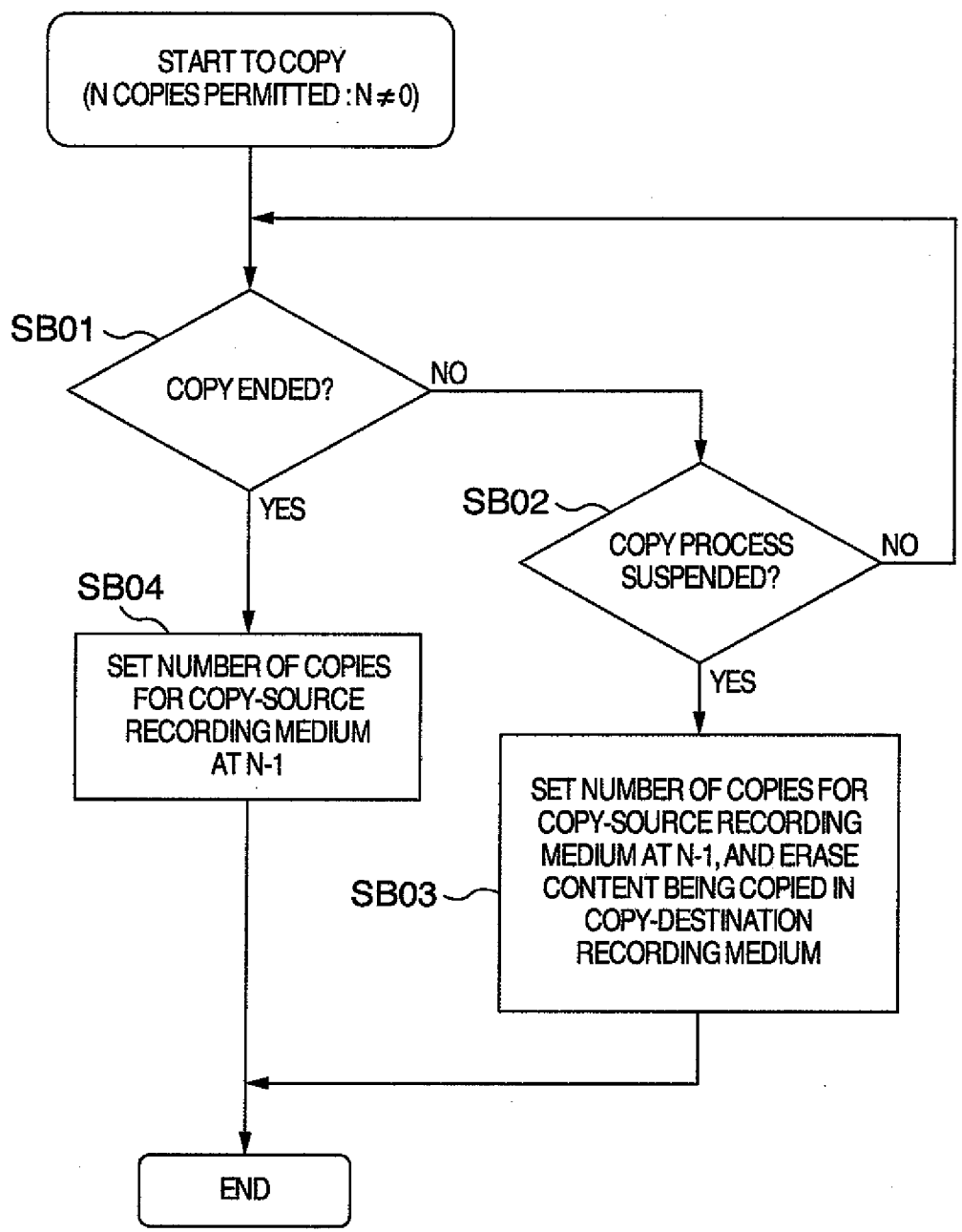
FIG. 14 is a flowchart showing an example of steps for copying the program contents.

FIG. 14 is a flowchart showing an example of steps of copying the program content in the receiving device 3.

During the copying process of a program content having the copy information "01" ("no more copies") of the management information and the number N (N≠0) of copies, whether the copying process has ended or not is monitored (SB01).

In the case where the copying process is ended, "N−1" (N≠0) is input as the number of copies of the management information in the copy source recording medium thereby entering a state in which (N−1) copies of the program content can be produced. Also, "01" ("no more copies") is input as the copy information of the management information in the recording medium of the copy destination thereby to set in a recopy prohibited state. Further, by inputting "0" as the number of copies in the management information, a state is realized in which the program content, though not adapted to be copied, can be moved (SB04).

The copying process, if not ended, on the other hand, is monitored as to whether it is suspended or not (SB02).

The copying process, if not suspended, is monitored as to whether it is ended or not (SB01).

In the case where the copying process is suspended, "N−1" (N≠0) is input as the number of copies in the management information of the recording medium of the copy source, thereby entering a state in which (N−1) copies of the program content can be produced, and in the case where the recording medium of the copy destination is capable of recording a plurality of copies, the program contents being copied are erased (SB03). In the case where the recording medium at the copy destination can record only once, however, the program contents cannot be erased, and therefore, the erase process is not executed.

By doing so, the program contents of the copy destination can be positively subjected to the copy generation management. Also, in the case where the copying process is suspended for some reason, the program contents not required for the copy destination are not left in the copy destination, and therefore, the subsequent extraneous labor which otherwise might be required for erasure is saved for an improved operating convenience. Incidentally, the data on the recording medium may be physically erased, or by erasing the management information, the data on the recording medium, though existing, can be prevented from being reproduced (indirectly erased).

<Moving Process Related to Copy Control Information>

Figure 15:
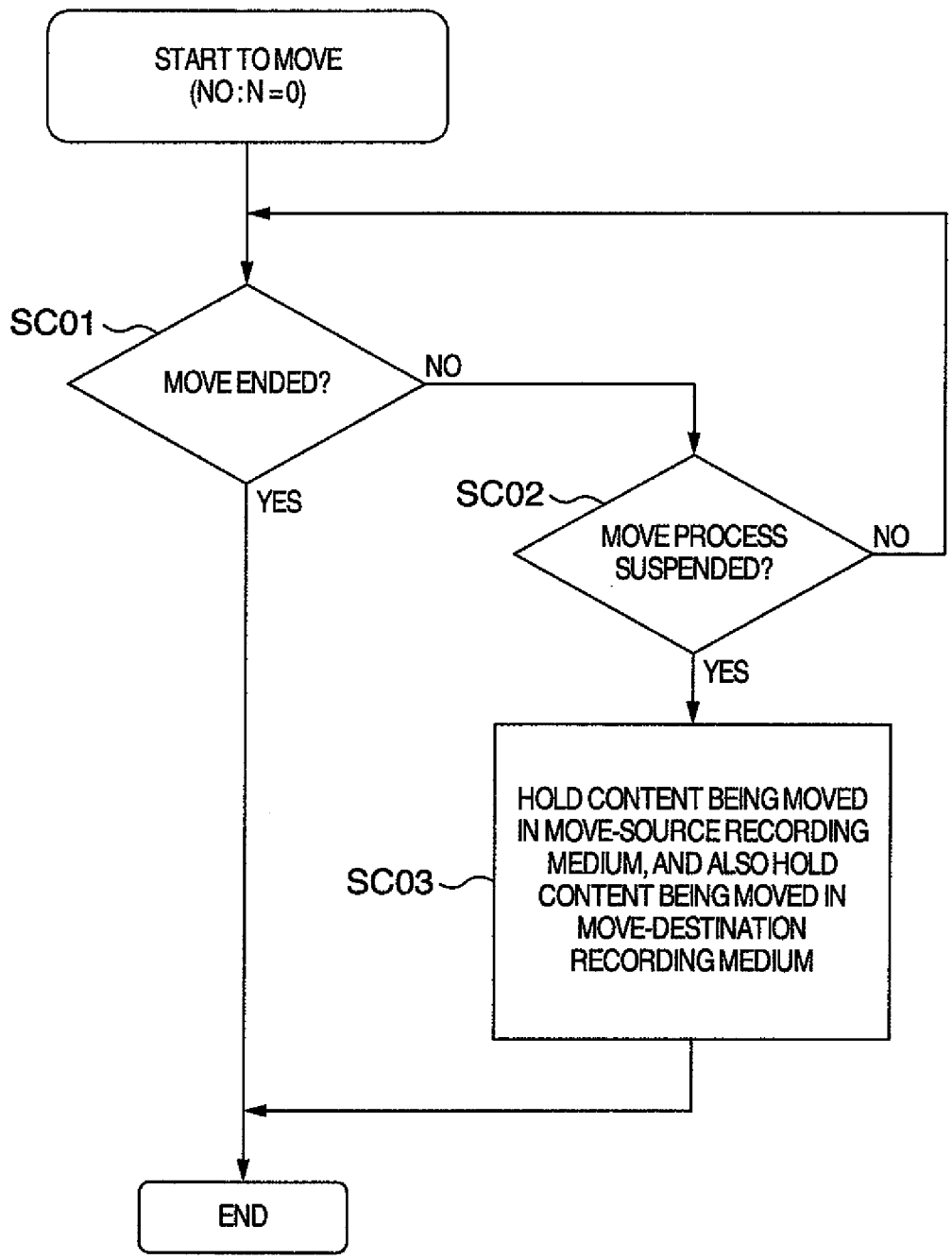
FIG. 15 is a flowchart showing an example of steps for moving the program contents.

FIG. 15 is a flowchart showing the steps of moving the program contents in the receiving device according to an embodiment.

In the case where the program content with the copy information of "01" ("no more copies") for the management information and the number of copies "0" is moving, whether the moving process is ended or not is monitored (SC01).

In the case where the moving process is ended, the program content in the recording medium of the move source and the management information related to the particular program content are erased. Then, "01" ("no more copies") is input as the copy information in the management information of the recording medium at the move destination thereby to set the recopy prohibit mode, while "0" is input as the number of copies in the management information into a state in which the program content, though not permitted to copy, can be moved.

The moving process, if not ended, is monitored as to whether it is suspended or not (SC02).

The moving process, if not suspended, is monitored as to whether it is ended or not (SC01).

In the case where the moving process is suspended, the part of the program contents being moved in the recording medium of the move source and not yet moved to the recording medium of the move destination and the management information related to the particular program content are held, while the program content that has already been moved to the recording medium of the move destination is rendered incapable of reproduction. The program contents midway of movement in the recording medium of the move destination are held, and by inputting "01" ("no more copies") in the copy information of the management information, the recopy prohibit mode is set, while "0" is input as the number of copies of the management information into a state in which the program content, though incapable of being copied, can be moved (SC03).

By doing so, the program contents of the move destination can be positively subjected to the copy generation management. Also, in the case where the moving process is suspended for some reason, the program contents are still viewable due to the fact that the program contents are held in the recording media of both the move source and the move destination, thereby improving the operating convenience. Incidentally, the data on the recording medium may be erased either physically or by erasing the management information and thereby making the data, though existent on the recording medium, incapable of being reproduced (indirectly erased).

In the foregoing description, the recording medium of the copy destination or the move destination can be managed in recopy prohibited mode ("no more copies"). In the case where the recording medium cannot be managed so, the copy or move process, as the case may be, is prohibited.

The foregoing description, though made about the program contents sent out from the broadcast station, is also applicable to the program contents sent out from, for example, the program content provider other than the broadcast station.

Also, the removable recording medium is defined as the one having an independent form removable from the receiving device and adapted for reproduction in other devices having the reproducing function.

Further, the term "move" means that the program content in "recopy prohibit" mode ("no more copies") recorded in a recording medium is moved to another recording medium by being made incapable of reproduction after being copied to the another recording medium. In the process, the expression "made incapable of reproduction" means that the reproduction is made impossible by erasing the program content itself, the encryption key or the management information. During the execution of the move process, a program content longer than one minute is undesirably existent in a state capable of reproduction at both the move source and the move destination at the same time.

In the foregoing description, the judgment as to whether a plurality of copies of the program content which is in "copy permitted for one generation" mode ("copy one generation") and in which the information indicating whether a plurality of copies can be produced or not is "yes" is made in accordance with whether the recording medium is built in or removable. As an alternative, however, the judgment as to whether a plurality of copies can be produced or not may be made in accordance with whether a recording medium is capable of managing a plurality of copies or not. The recording medium capable of managing a plurality of copies is, for example, the one in which such information as the copy information 507, the copy number 508 and the key information 506 (which information may further include the file number 503, the date/time 504, the head address of the data field and the recording size 505) included in the management information indicating the specifics of the program contents described with reference to FIG. 12 can be managed in a manner not to be illegally altered.

Figure 16:
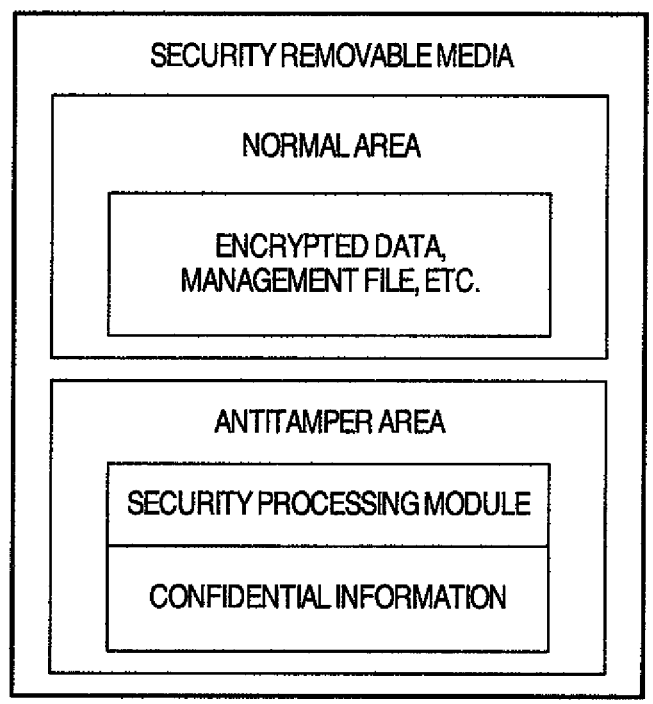
FIG. 16 is a diagram showing an example of the recording medium capable of managing a plurality of copies.

FIG. 16 shows an example of the configuration of a recording medium (security removable medium) capable of managing a plurality of copies (also called the copy number control or the number controlled copy). In this configuration, a single recording medium has both a normal area accessible by the user and an antitamper area inaccessible by the user. The confidential information stored in the antitamper area can be accessed and managed in the case where the authentication can be confirmed by the authentication process with a device adapted to handle the recording medium. The illegal alteration is prevented by storing and managing the copy information 507, the copy number 508 and the key information 506 in this antitamper area.

The recording medium incapable of managing a plurality of copies, on the other hand, is defined as the one incapable of management to prevent the illegal alteration of the information such as the copy information 507, the copy number 508 and the key information 506 (which information may further include the file number 503, the date/time 504, the head address of the data field and the recording size 505) included in the management information indicating the specifics of the program contents.

Figure 17:
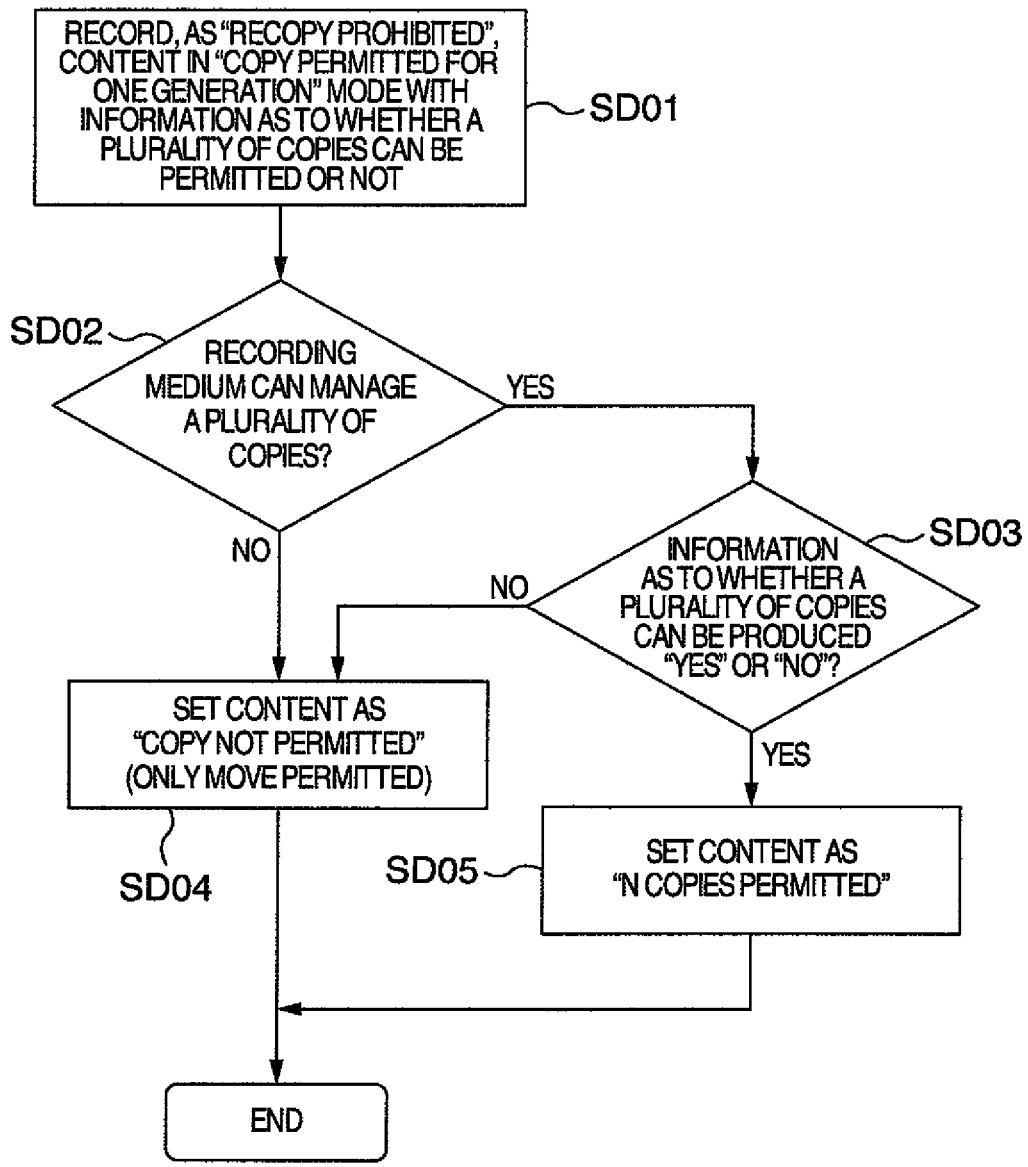
FIG. 17 is a flowchart showing an example of steps for generating the copy information in the management information and the number of copies in recording the program content permitted to copy for one generation.

FIG. 17 is a flowchart showing an example of steps of generating the copy information and the copy number as the management information in recording the program content in the form "copy permitted for one generation" ("copy one generation") of the receiving device taking into consideration both the recording media capable and incapable of managing a plurality of copies. The difference of this flowchart from FIG. 13 lies in SD02. Incidentally, this flowchart may be combined with FIG. 13, in which case SD02 may be executed, for example, in the case where the answer in step SA02 is "removable".

The control unit 114, for example, judges whether the recording medium having the program content recorded therein can or cannot manage a plurality of copies, and notifies the content management information generating unit 119.

The recording medium incapable of managing a plurality of copies is set in such a state that by inputting "0" in the copy number of the management information, for example, the program content cannot be copied but can be moved (SD04).

In the recording medium capable of managing a plurality of copies, on the other hand, the content management information generating unit 119 judges whether the information indicating whether a plurality of copies can be produced or not is "yes" or "no" (SD03), and in the case where the answer is "no", "0" is input, for example, as the number of copies in the management information thereby to set the recording medium in such a state that the program content, though incapable of being copied, can be moved (SD04). In the case where the answer is "yes" in step SD03, on the other hand, "N" is input as the number of copies in the management information to realize a state in which N copies of the program content can be produced (SD05).

By doing so, a plurality of copies of the program content already recorded as "copy permitted for one generation" can be produced at any time, resulting in an improved operating convenience. Also, by judging whether a plurality of copies can be produced or not according to whether the recording medium can or cannot manage a plurality of copies, the permission to produce a plurality of copies which otherwise might be granted to a recording medium incapable of producing a plurality of copies can be avoided, thereby further improving the effect of protecting the program contents.

As described above, assuming that the digital copy control information is in the form "copy permitted for one generation", the mode "limited number of copies permitted" is judged to prevail in the case where "digital_recording_control_mode" is "1", while the mode "limited number of copies permitted" is not judged to prevail in the case where "digital_recording_control_mode" is "0". Nevertheless, the judgment of "0" or "1" may be set conversely, for example, in accordance with the convenience of the system of the broadcast station.

Specifically, assuming that the digital copy control information is in the form "copy permitted for one generation", the mode "limited number of copies permitted" may be judged to prevail in the case where "digital_recording_control_mode" is "0", while "limited number of copies permitted" is not judged to prevail in the case where "digital_recording_control_mode" is "1". Similarly, the meaning of the value indicated by other descriptors may be differently set in accordance with the prevailing situation.

Also, the meaning of the value indicated by each descriptor such as "digital_recording_control_mode" is preferably determined uniquely by standardization.

Further, the name of the content use descriptor or the digital copy control descriptor (such as "digital_recording_control_mode" or "digital_recording_control_data") is not necessarily the same as the one described in the embodiments, but other names may be employed with equal effect.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording/reproducing method in a recording apparatus comprising:
   a receiving step, for receiving a digital content and for receiving copy control information to control copying of the digital content;
   a recording/reproducing step, for recording, in a recording medium, the digital content received in the receiving step, and reproducing the digital content recorded in the recording medium; and
   an outputting step to an external apparatus, for outputting the digital content recorded in the recording medium;
   wherein when the copy control information received in the receiving step indicates permission for making a predetermined number of copies, the digital content received in the receiving step is:
   recorded in the recording medium,
   managed such that the number of copies from the digital content recorded in the recording medium is within the predetermined number, and
   when the digital content recorded in the recording medium is copied to the external apparatus in the outputting step, the digital content is managed such that a total of the following is within the predetermined number: (a) the number of copies currently generable from the digital content recorded in the recording medium, (b) the number of copies of the digital content which has been already copied from the recording medium to the external apparatus, and (c) the number of copies generable from the digital content copied to the external apparatus.

2. The method according to claim 1, wherein when the digital content recorded in the recording medium is copied to the external apparatus, the recording/reproducing method further comprises:
   storing information indicating the number of copies permitted, in at least one transmission packet separate from transmission packets constituting the digital content; and
   outputting said information indicating the number of copies permitted stored in said at least one transmission packet separate from transmission packets constituting the digital content.

3. The method according to claim 1, wherein the recording medium is built in the recording apparatus.

4. A recording/reproducing apparatus, comprising:
   a receiving unit configured to receive a digital content and copy control information to control copying of the digital content;
   a recording/reproducing unit configured to record, in a recording medium, the digital content received in the receiving unit, and to reproduce the digital content recorded in the recording medium;
   an outputting unit configured to output the digital content recorded in the recording medium to an external apparatus, and
   a control unit configured to control the receiving unit, the recording/reproducing unit and the outputting unit;
   wherein the control unit is configured to perform the following, when the copy control information received in the receiving unit indicates permission of making a predetermined number of copies:
   record in the recording medium, by using the recording/reproducing unit, the digital content received in the receiving unit,
   manage the digital content recorded in the recording medium such that the number of copies from the digital content recorded in the recording medium is within the predetermined number, and
   when the digital content recorded in the recording medium is copied to the external apparatus by the outputting unit, manage the digital content such that a total of the following is within the predetermined number: (a) the number of copies currently generable from the digital content recorded in the recording medium, (b) the number of copies of the digital content which has been already copied from the recording medium to the external apparatus, and (c) the number of copies generable from the digital content copied to the external apparatus.

5. The apparatus according to claim 4, wherein the control unit is configured to, when the digital content recorded in the recording medium is copied to the external apparatus:
   store information indicating the number of copies permitted, in at least one transmission packet separate from transmission packets constituting the digital content; and
   output said at least one transmission packet separate from transmission packets constituting the digital content.

6. The apparatus according to claim 4, wherein the recording medium is built in the recording apparatus.

7. A recording/reproducing apparatus, comprising:
   a receiving means for receiving a digital content and copy control information to control copying of the digital content;
   a recording/reproducing means for recording, in a recording medium, the digital content received in the receiving means, and reproducing the digital content recorded in the recording medium;
   an outputting means for outputting the digital content recorded in the recording medium to an external apparatus, and
   a control means for controlling the receiving means, the recording/reproducing means and the outputting means;
   wherein the control means is for, when the copy control information received in the receiving means indicates permission of making a predetermined number of copies:
   recording in the recording medium, by using the recording/reproducing means, the digital content received in the receiving means,
   managing the digital content recorded in the recording medium such that the number of copies from the digital content recorded in the recording medium is within the predetermined number, and
   when the digital content recorded in the recording medium is copied to the external apparatus by the outputting means, managing the digital content such that a total of the following is within the predetermined number: (a) the number of copies currently generable from the digital content recorded in the recording medium, (b) the number of copies of the digital content which has been already copied from the recording medium to the external apparatus, and (c) the number of copies generable from the digital content copied to the external apparatus.

8. The apparatus according to claim 7, wherein the control means is for, when the digital content recorded in the recording medium is copied to the external apparatus:

storing information indicating the number of copies permitted, in at least one transmission packet separate from transmission packets constituting the digital content; and outputting said at least one transmission packet separate from transmission packets constituting the digital content.

9. The apparatus according to claim 7, wherein the recording medium is built in the recording apparatus.

10. The recording/reproducing method according to claim 1, wherein when the digital content recorded in the recording medium is copied to the external apparatus in the outputting step, if all copies from the digital content recorded in the recording medium are copied to the external apparatus, the total of the number of copies is kept unchanged and the digital content recorded in the recording medium is made incapable of reproduction after being copied to the external apparatus.

11. The recording/reproducing apparatus according to claim 4, wherein when the digital content recorded in the recording medium is copied to the external apparatus by the outputting unit, if all copies from the digital content recorded in the recording medium are copied to the external apparatus, the total of the number of copies is kept unchanged and the digital content recorded in the recording medium is made incapable of reproduction after being copied to the external apparatus.

* * * * *